United States Patent
Schlarmann et al.

(10) Patent No.: US 9,116,165 B2
(45) Date of Patent: Aug. 25, 2015

(54) MICROELECTROMECHANICAL SYSTEM PACKAGE AND METHOD OF TESTING

(75) Inventors: Mark E. Schlarmann, Chandler, AZ (US); Yau Kin Hon, Gilbert, AZ (US); Eric W. Tisinger, Chandler, AZ (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 568 days.

(21) Appl. No.: 13/431,469

(22) Filed: Mar. 27, 2012

(65) Prior Publication Data

US 2013/0257445 A1    Oct. 3, 2013

(51) Int. Cl.
G01R 27/26 (2006.01)
G01P 21/00 (2006.01)
G01P 15/125 (2006.01)

(52) U.S. Cl.
CPC .............. *G01P 21/00* (2013.01); *G01P 15/125* (2013.01)

(58) Field of Classification Search
USPC .................................. 324/452–456, 658–690
See application file for complete search history.

(56) References Cited

U.S. PATENT DOCUMENTS

| | | | |
|---|---|---|---|
| 5,506,454 A * | 4/1996 | Hanzawa et al. ............ 307/10.1 |
| 8,726,717 B2 * | 5/2014 | Supino et al. ................... 73/1.77 |
| 8,763,441 B2 * | 7/2014 | Casinovi et al. ................ 73/1.77 |
| 2003/0101814 A1 * | 6/2003 | Challoner et al. .......... 73/504.12 |
| 2003/0201777 A1 * | 10/2003 | Gogoi et al. .................... 324/415 |
| 2005/0253596 A1 * | 11/2005 | Kitano et al. ................... 324/658 |
| 2006/0283246 A1 * | 12/2006 | Weinberg et al. .......... 73/504.16 |
| 2007/0108965 A1 * | 5/2007 | Martin et al. ............. 324/158.1 |
| 2009/0241634 A1 * | 10/2009 | Acar .............................. 73/1.79 |
| 2010/0251800 A1 * | 10/2010 | Mueck ........................... 73/1.38 |
| 2011/0023605 A1 * | 2/2011 | Tripoli et al. .............. 73/514.32 |
| 2011/0146402 A1 * | 6/2011 | Donadel et al. ............ 73/504.12 |

* cited by examiner

*Primary Examiner* — Patrick Assouad
*Assistant Examiner* — Demetrius Pretlow
(74) *Attorney, Agent, or Firm* — Charlene R. Jacobsen (57) ABSTRACT

A microelectromechanical system (MEMS) package is disclosed herein. The MEMS package includes a movable mass. The MEMS package further includes a first and second sense electrodes spaced apart from the movable mass. The first and second sense electrodes are configured to be electrically coupled with a controller. The MEMS package further includes a first test electrode and a second test electrode spaced apart from the movable mass. The first and the second test electrodes are configured to be electrically connected to first and second external electrical connectors, respectively. The first and second test electrodes are biased at a first voltage and a second voltage, respectively, when the first and second external electrical connectors are connected to external voltage sources.

15 Claims, 4 Drawing Sheets

MICROELECTROMECHANICAL SYSTEM PACKAGE AND METHOD OF TESTING

TECHNICAL FIELD

Embodiments of the present invention relate generally to electronic devices and, more particularly, to a microelectromechanical system package and a method of testing a microelectromechanical system.

BACKGROUND

Microelectromechanical systems (referred to herein interchangeably as either microelectromechanical systems or MEMS) devices are widely used in applications such as automotive, inertial guidance systems, household appliances, protection systems for a variety of devices, and many other industrial, scientific, and engineering systems. Such MEMS devices are used to sense a physical condition such as acceleration, pressure, or temperature, and to provide an electrical signal representative of the sensed physical condition. MEMS are commonly provided as part of a package (also referred to herein as a "package assembly") that includes a substrate to which the MEMS is mounted and further including, in some embodiments, additional components mounted to the substrate. In some embodiments, the additional components may be coupled with, and configured to engage, the MEMS.

BRIEF DESCRIPTION OF THE DRAWINGS

At least one example of the present invention will hereinafter be described in conjunction with the following figures, wherein like numerals denote like elements, and.

For simplicity and clarity of illustration, the figures illustrate the general manner of construction and/or manufacture for one or more exemplary embodiments of the present invention. Unless otherwise stated, the elements shown in the figures are not necessarily drawn to scale. For example, the dimensions of certain elements or regions in the figures may be exaggerated relative to other elements or regions to help improve understanding of embodiments of the invention.

DETAILED DESCRIPTION

The following Detailed Description is merely exemplary in nature and is not intended to limit the invention or the application and uses of the invention. Any implementation described herein as exemplary is not necessarily to be construed as preferred or advantageous over other implementations. Furthermore, there is no intention to be bound by any theory presented in the preceding Background or the following Detailed Description.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Terms such as "comprise," "include," "have," "contain," and variations thereof are utilized in a non-exclusive sense such that a process, method, article, or apparatus described as comprising, including, having, containing, an element or step or a list of elements or steps is not necessarily limited to those elements, but may include other elements or steps not expressly listed or inherent to such process, method, article, or apparatus.

Figure 1:
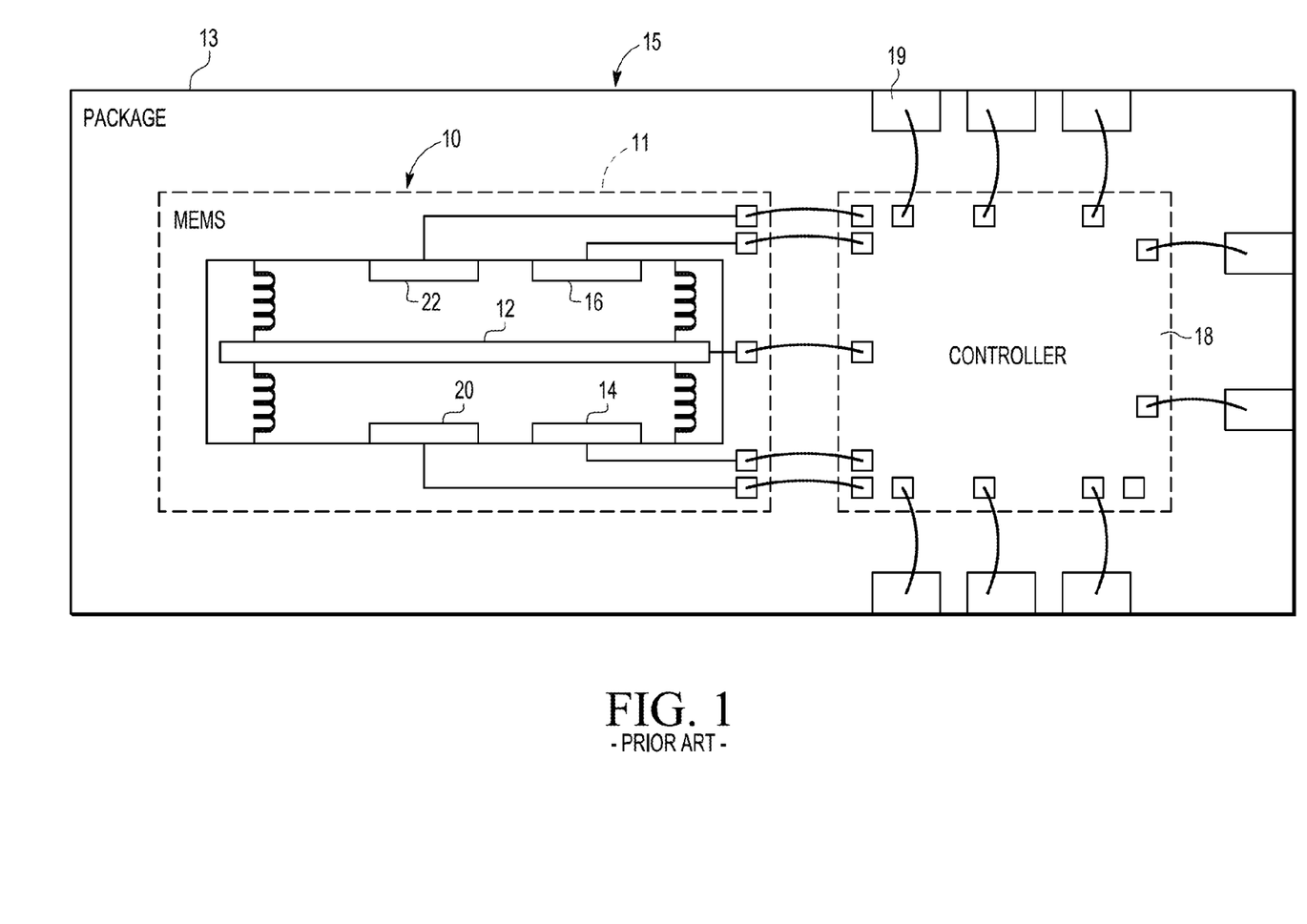
FIG. 1 is a schematic view of a package assembly including a prior art microelectromechanical system.

Microelectromechanical systems can be configured to serve many purposes. For example, a microelectromechanical system may be configured as an accelerometer to detect motion and/or acceleration. A conventional microelectromechanical system 10 configured as an accelerometer is illustrated in FIG. 1. Conventional microelectromechanical system 10 includes a movable mass 12 suspended on springs between a sense electrode 14 and a sense electrode 16. It will be understood by those of ordinary skill in the art that terms such as electrode, plate, pin, post, lead, wire, and the like are all forms of electrical connectors. These terms will be used herein interchangeably. These components are incorporated into a die 11 that is, in turn, mounted to a substrate 13. A controller 18 (e.g., a microprocessor, an Application-Specific Integrated Circuit (ASIC), etc. . . . ) is also mounted to substrate 13. Together, conventional microelectromechanical system 10, controller 18, and substrate 13 will be referred to herein as a package assembly 15. It should be understood that in other embodiments, package assembly 15 may include additional components. Package assembly 15 may be installed in a device such as a smart phone, tablet, crash sensor, and the like. When conventional microelectromechanical system 10 begins to move and/or accelerate, movable mass 12 will be deflected from its central position between sense electrodes 14 and 16. Thus, the orientation and/or acceleration of a device to which conventional microelectromechanical system 10 is attached can be detected by detecting movement of movable mass 12.

Movement of movable mass 12 can be detected based on changes in capacitance. Sense electrodes 14 and 16 are positioned at substantially equal distances from movable mass 12. As long as movable mass 12 remains equidistant between sense electrodes 14 and 16, the capacitance between movable mass 12 and sense electrode 14 will be substantially equal to the capacitance between movable mass 12 and sense electrode 16. As conventional microelectromechanical system 10 experiences acceleration, movable mass 12 will move towards one sense electrode and away from the other causing the capacitance between movable mass 12 and each of the sense electrodes to change. As is well known in the art, the closer that movable mass 12 is to one of the sense electrodes, the greater the capacitance will be between the movable mass 12 and that sense electrode. Correspondingly, the further away that movable mass 12 is from one of the sense electrodes, the lower the capacitance will be between movable mass 12 and that sense electrode.

Conventional microelectromechanical system 10 is configured such that sense electrodes 14 and 16 are electrically connected to controller 18. Controller 18 is configured to monitor the capacitance between sense electrode 14 and movable mass 12 and the capacitance between sense electrode 16 and movable mass 12 and is further configured to detect a differential between the two capacitances. When a differential in capacitance is detected by controller 18, conventional, movable mass 12 has been deflected from its central position between sense electrodes 14 and 16 and it can be concluded that the device to which conventional microelectromechanical system 10 is attached is accelerating.

Conventional microelectromechanical system 10 is further configured to permit self-testing of the accelerometer by controller 18. To enable self-testing, conventional microelectromechanical system 10 includes a self-test electrode 20 and a self-test electrode 22 mounted to die 11. Self-test electrode 20 and self-test electrode 22 are each positioned on opposite sides of movable mass 12 and electrically connected to controller 18. Controller 18 is electrically connected to package post 19 and may receive electric power through package post 19 from the device to which package assembly 15 is attached. Controller 18 is configured to apply a voltage to self-test electrodes 20 and 22 that puts self-test electrode 20 and self-test electrode 22 at different voltages. When self-test electrode 20 and self-test electrode 22 are at different voltages, an electrostatic force is generated by the self-test electrodes that will cause movable mass 12 to deflect from its central position between sense electrodes 14 and 16. One conventional approach is to drive one of the self-test electrodes to the same potential as the movable mass and to apply a different voltage to the other self-test electrode. For the self-test electrode that is driven to the same potential as the movable mass, the electrostatic force is zero. For the other self-test electrode, the magnitude of the electrostatic force depends on the difference in voltage between the movable mass and the voltage applied to the other self-test electrode. The direction of the force depends on the position of the self-test electrode relative to the movable mass. The movement of movable mass 12 out of the central position will give rise to a differential in the capacitance between movable mass 12 and each of the two sense electrodes 14 and 16. This, in turn, will be detected by controller 18. Configured in this manner, any device to which package assembly 15 is attached can instruct controller 18 to conduct a self-test anytime that self-testing is desired.

The ability to conduct self-tests is not only useful to the device that incorporates conventional microelectromechanical system 10, but it is also useful to the manufacturer. For example, the manufacturer may wish to test each conventional microelectromechanical system 10 as they come off the assembly line to ensure the quality of its products. In the absence of self-test electrodes 20 and 22, the manufacture would have to engage in shaker testing (testing that would shake, re-orient, or otherwise exert a force on conventional microelectromechanical system 10 to cause movable mass 12 to move). Shaker testing may require the use of specialized testing equipment. This, in turn, entails additional costs to the manufacturer. By configuring conventional microelectromechanical system 10 with self-test electrodes 20 and 22, the manufacturer can reduce the need to conduct shaker tests and may make greater use of industry standard testing equipment when testing microelectromechanical systems during the fabrication process.

As set forth in the background section above, conventional microelectromechanical system 10 may be employed in a wide variety of applications. For example, conventional microelectromechanical system 10 may be used to detect the orientation of a smart phone or to trigger an airbag deployment in the event of a vehicle collision, to name just a few applications. These two applications involve the exertion of substantially different levels of force and serve to illustrate the desirability for conventional microelectromechanical system 10 to be tailored to specific applications. For example, it is desirable for movable mass 12 to move in response to relatively low forces when conventional microelectromechanical system 10 is installed in a smart phone for the purpose of detecting the orientation of the smart phone. In another example, it is desirable for movable mass 12 to remain substantially stationary in the presence of relatively low forces and to move only in response to relatively high forces when conventional microelectromechanical system 10 is installed in a vehicle crash detector. The responsiveness of movable mass 12 to forces of differing magnitudes can be tailored by selecting springs having an appropriate spring constant when mounting movable mass 12 to conventional microelectromechanical system 10. For example, in applications where it is desirable to inhibit movement of movable mass 12 until relatively large forces are experienced, springs having a relatively high spring constant may be selected. In applications where it is desirable to permit movement of movable mass 12 in response to the exertion of relatively low forces, springs having a relatively low spring constant may be selected.

The differing levels of force corresponding with springs having differing spring constants will, in turn, have an impact on the ability to conduct self-testing of conventional microelectromechanical system 10. The stiffer the spring, the greater the force that is needed to deflect movable mass 12. The amount of electrostatic force that can be generated by self-test electrodes 20 and 22 depends on the surface area of the self-test electrodes and on the magnitude of the voltage applied to the self-test electrodes. The greater the surface area of the self-test electrodes, the greater the electrostatic force will be. Similarly, the larger the voltage applied to the self-test electrodes, the greater the electrostatic force will be. Therefore, when relatively stiff springs are used to mount movable mass 12 to conventional microelectromechanical system 10, it is desirable to increase the size of the self-test electrodes and to employ greater voltages to obtain the desired deflection of movable mass 12.

However, packaging considerations may make it undesirable to enlarge the self-test electrodes beyond a predetermined limit because doing so may require an increase in the size of conventional microelectromechanical system 10 which could result in an increase in the size of die 11, an increase in the size of substrate 13, and, an increase in the size of package assembly 15 which may be unacceptable. Similarly, the voltage of controller 18 will limit the magnitude of the voltage that can be applied to the self-test electrodes to a predetermined maximum voltage. Depending upon the stiffness of the spring, this predetermined maximum voltage may be insufficient to obtain the desired deflection of movable mass 12. Accordingly, in circumstances where movable mass 12 is fitted with relatively stiff springs, the maximum acceptable surface area of the self-test electrodes and the predetermined maximum voltage are limiting factors that may result in less deflection of movable mass 12 than is desired by the manufacturer when conducting a self-test of the conventional microelectromechanical system 10.

A solution is taught herein that permits relatively high electrostatic forces to be applied to the movable mass by altering the configuration of conventional microelectromechanical system 10 to include additional test electrodes positioned on opposite sides of the movable mass. The additional test electrodes are electrically connected to additional pins on the package assembly that are configured to receive a voltage. The electric connection to the additional test electrodes is configured such that the voltage that is applied to the additional pins is not routed through the controller and is therefore not limited by the controller to the predetermined maximum voltage. Therefore, the voltage applied to the additional test electrodes may be as large as necessary to obtain the electrostatic force needed to cause any desired amount of deflection of the movable mass, regardless of the stiffness of the springs supporting the movable mass.

Figure 2:
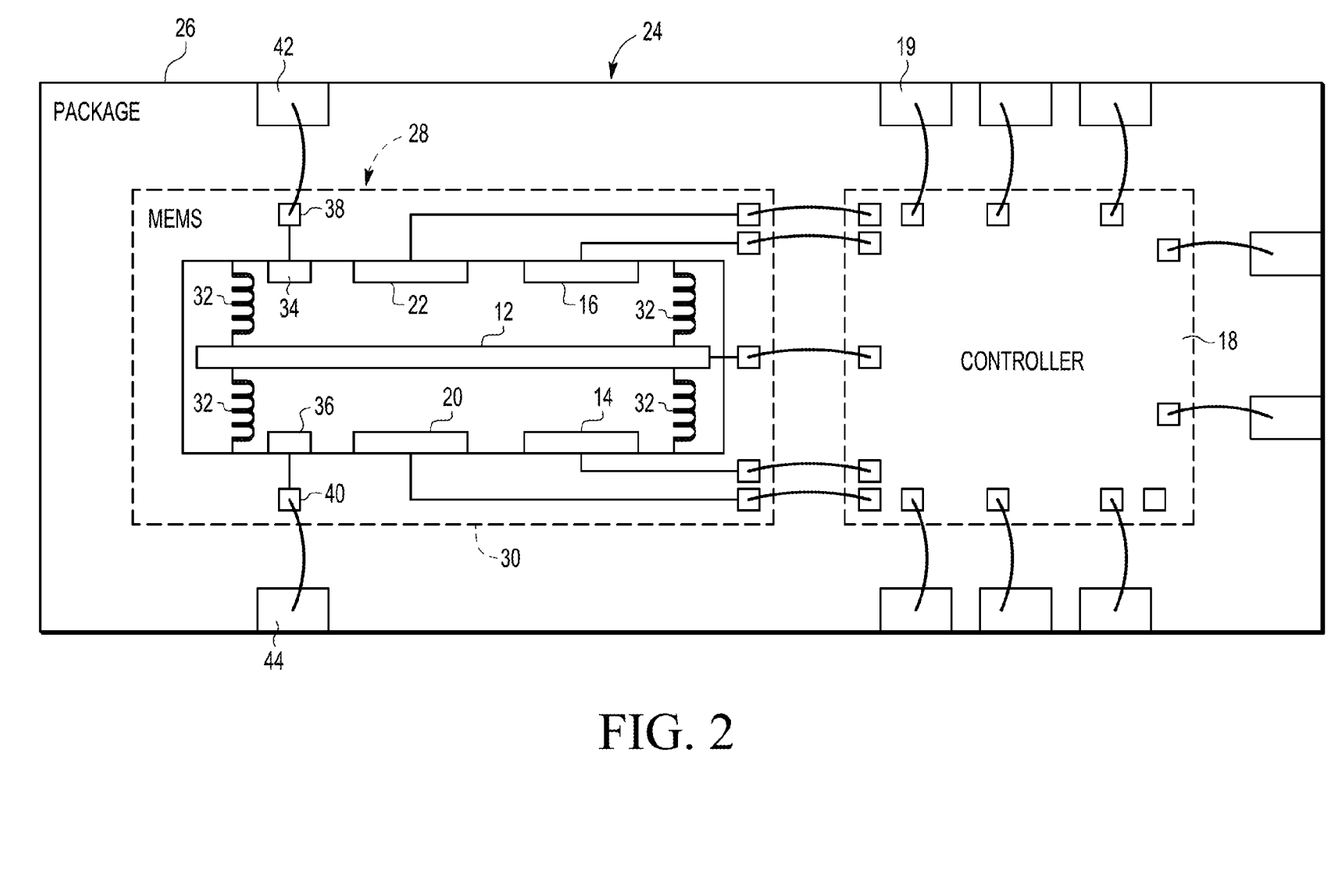
FIG. 2 is a schematic view of a package assembly including a non-limiting example of a microelectromechanical system illustrated in accordance with the teachings of the present disclosure.

FIG. 2 is a schematic view illustrating a non-limiting embodiment of a package assembly 24 configured for installation in an end product (e.g., a smart phone, mobile device, a crash sensor, etc.). Package assembly 24 includes, but is not limited to, a substrate 26, and a micro-electro-mechanical system 28 and controller 18 mounted to substrate 26. Microelectromechanical system 28 includes a substrate 30 (also referred to herein as a die) that includes sense electrode 14, sense electrode 16, self-test electrode 20, self-test electrode 22, and movable mass 12. Movable mass 12 is connected to substrate 30 via springs 32 which support movable mass 12 between sense electrode 14 sense electrode 16 in a manner that permits movable mass 12 to move in response to forces encountered by package assembly 24.

Microelectromechanical system 28 further includes test electrode 34 and test electrode 36 mounted to substrate 30 on opposite sides of movable mass 12. In the illustrated embodiment, test electrode 34 and test electrode 36 are positioned at substantially equal distances from movable mass 12. In other embodiments, test electrodes 34 and 36 may be mounted to substrate 30 in positions that are not substantially equidistant from movable mass 12. It should be understood that the above described configuration (as illustrated in FIG. 2) is merely one way to configure a MEMS device. In other embodiments, the movable mass may be configured in a teeter totter arrangement such that the movable mass pivots about a pivot point and the test electrodes may be positioned on the same side of the movable mass and located on opposite sides of the pivot point. In such a configuration, the sense electrodes may also be positioned on the same side of the movable mass and on opposite sides of the pivot point. In still other configurations, sense electrodes may be positioned above and below the movable mass and the movable mass may be configured to move up and down in response to acceleration. Other configurations are also possible.

In the embodiment illustrated in FIG. 2, test electrode 34 is electrically connected to an electrically conductive pad 38 and test electrode 36 is electrically connected to electrically conductive pad 40. Electrically conductive pad 38 is electrically connected to an electrically conductive package post 42 of package assembly 24 and electrically conductive pad 40 is electrically connected to electrically conductive package post 44 of package assembly 24. Electrically conductive package posts 42 and 44 are electrically connected to electrically conductive pins (not shown) of package assembly 24 which are accessible to industry-standard testing equipment as package assembly 24 is fabricated on an assembly line. As used herein in connection with the embodiments illustrated in FIGS. 2-4, the terms "electrically conductive pad", "electrically conductive package post" and "package pin" are all forms of an external electrical connector that is electrically insulated from controller 18. When industry-standard testing equipment applies a voltage across the pins that are electrically connected to electrically conductive package posts 42 and 44 (the voltage may be applied to electrically conductive package posts 42 and 44 one at a time or substantially simultaneously), an electrostatic pressure is exerted by test electrode 34 and test electrode 36 on movable mass 12 that causes movable mass 12 to deflect from a central position between sense electrodes 14 and 16. This deflection will alter the capacitance that exists between movable mass 12 and each of sense electrodes 14 and 16, causing one capacitance to increase and causing the other capacitance to decrease. This differential in capacitance will be detected by controller 18 and will be interpreted by controller 18 as movement and/or acceleration of package assembly 24.

The electrical connection between test electrode 34 and electrically conductive package post 42 and the electrical connection between test electrode 36 and electrically conductive package post 44 are not routed through controller 18. Rather, they are electrically insulated from controller 18. Accordingly, test electrodes 34 and 36 and package posts 42 and 44 may be configured to operate at a higher voltage range than controller 18 and controller 18 will not limit the maximum voltage that can be applied to test electrode 34 and test electrode 36. Accordingly, the configuration of microelectromechanical system 28 illustrated in FIG. 2 can effectively test microelectromechanical systems that utilize springs 32 having relatively high spring constants.

Figure 3:
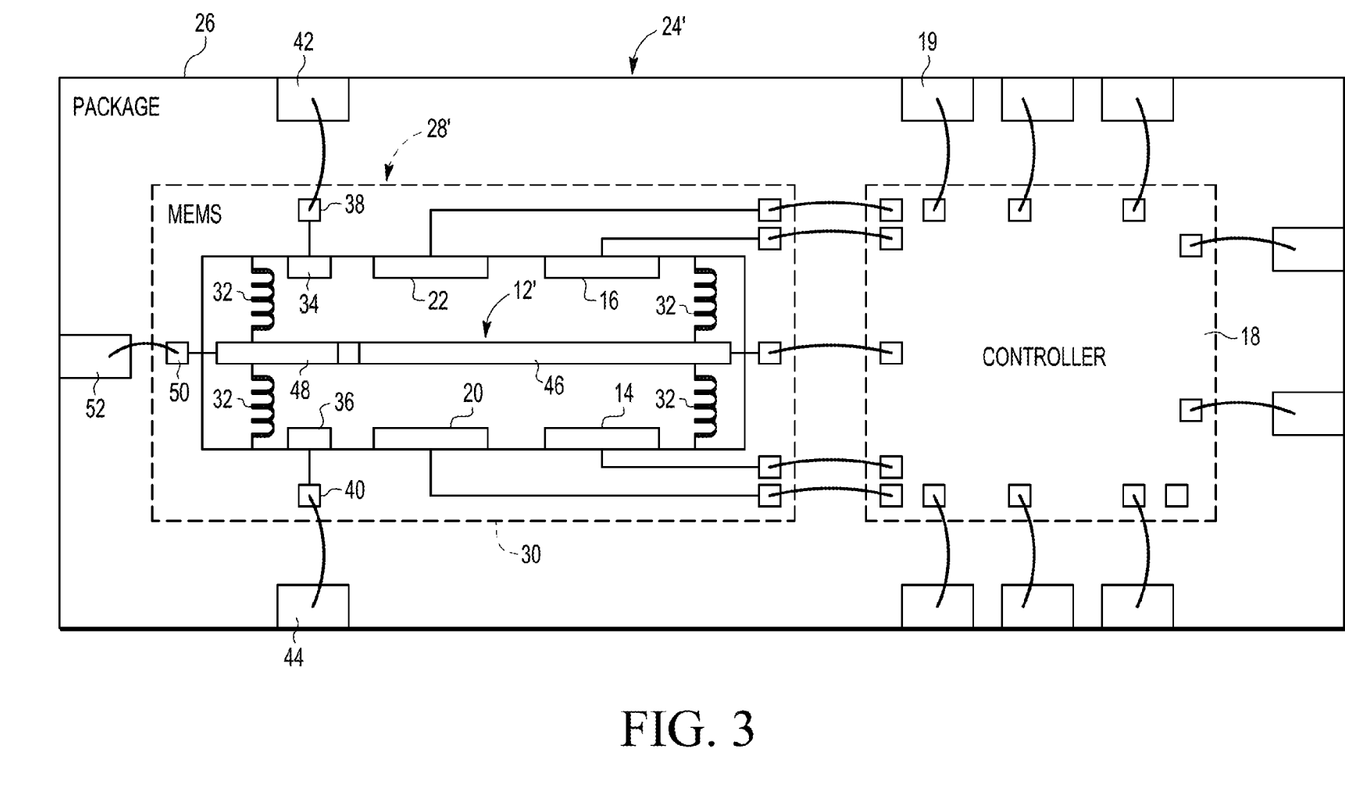
FIG. 3 is a schematic view of a package assembly including another non-limiting example of a microelectromechanical system illustrated in accordance with the teachings of the present disclosure.

FIG. 3 is a schematic view illustrating another non-limiting embodiment of a package assembly 24' configured for installation in an end product. Package assembly 24' includes a substrate 26 to which a microelectromechanical system 28' and controller 18 are mounted. As with microelectromechanical system 28 of FIG. 2, microelectromechanical system 28' includes sense electrodes 14 and 16, self-test electrodes 20 and 22, test electrodes 34 and 36, and a movable mass 12' supported at a substantially equal distance from sense electrode 14 and sense electrode 16 via springs 32.

Movable mass 12' differs from movable mass 12 of FIG. 2 in that movable mass 12' has been divided into two portions, a first portion 46 and a second portion 48. First portion 46 and second portion 48 are electrically insulated from one another. Electrically insulating different portions of a movable mass is well known in the art and may be accomplished in any suitable manner. For example, the well-known technique of trench isolation may be employed to electrically insulate first portion 46 from second portion 48. It will be understood by those of ordinary skill in the art that despite the electrical insulation between first portion 46 and second portion 48, the two portions may, nevertheless, comprise a single, integral component or may comprise two separate components that are mechanically connected to one another.

Microelectromechanical system 28' further includes electrically conductive pad 50 electrically connected to second portion 48. Package assembly 24' further includes electrically conductive package post 52 which is electrically connected to electrically conductive pad 50. Electrically conductive package post 52 is, in turn, electrically connected to a package pin (not shown) of package assembly 24' which is accessible to industry-standard testing equipment as package assembly 24' is being fabricated on an assembly line. A voltage may be applied to the pin that is electrically connected to electrically conductive package post 52 and, in turn, the voltage will be applied to second portion 48 via electrically conductive pad 50. This has the effect of maintaining second portion 48 of movable mass 12' at a substantially constant voltage. The maintenance of second portion 48 at a substantially constant voltage may be desirable in circumstances where the voltage on first portion 46 fluctuates. When the voltage on second portion 48 is held stable, dropping a voltage across test electrodes 34 and 36 will yield stable and predictable electrostatic forces being applied to movable mass 12' which may be desirable when testing microelectromechanical system 28' with industry standard testing equipment. In some embodiments, industry standard testing equipment may apply a voltage to only one of test electrodes 34 and 36 to cause movement of movable mass 12'.

Figure 4:
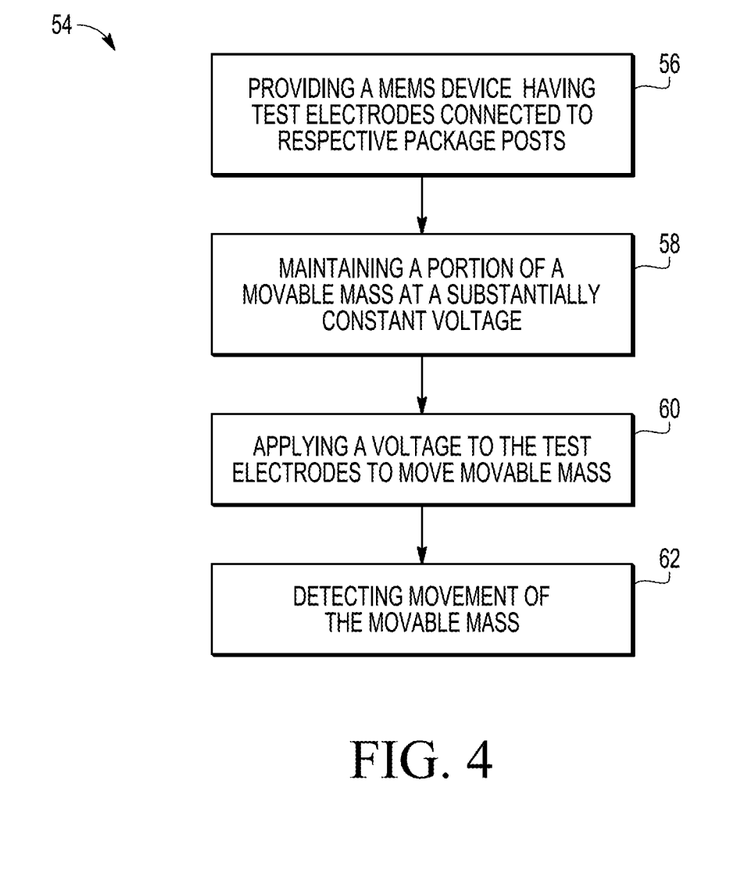
FIG. 4 is a block diagram illustrating a non-limiting example of a method for testing a microelectromechanical system illustrated in accordance with the teachings of the present disclosure.

FIG. 4 is a block diagram illustrating a non-limiting embodiment of a method for testing a microelectromechanical system. At block 56 a suitable microelectromechanical system, such as, but not limited to, microelectromechanical system 28 and microelectromechanical system 28' discussed above in conjunction with FIGS. 2 and 3, is provided. The microelectromechanical system may include a pair of test electrodes that are disposed on opposite sides of a movable mass, or in embodiments where the movable mass is configured to move as a teeter totter, the pair of test electrodes will be located on the same side of the movable mass. The test electrodes are electrically connected to package posts and/or pins or other electrical conductors. The path of electrical connection between the test electrodes and the package posts and/or pins is not routed through a controller. The package posts and/or pins are accessible to industry-standard testing machinery.

At block 58, in embodiments having a movable mass that is divided into a first portion and a second portion that are electrically insulated from one another, either the first portion or the second portion of the movable mass is maintained at a substantially constant voltage. This may be accomplished by electrically connecting the first portion or the second portion to an electric power source generating a substantially constant voltage.

At block 60, a voltage is applied across the package posts and/or the pins and or any other electrical conductor that is electrically connected to the test electrodes. The resultant potential differences between each test electrode and the movable mass will, in turn, induce electrostatic forces, which can deflect the movable mass. In some embodiments, the package posts may have a voltage applied that is fixed relative to the voltage on the movable mass and then one of the voltages to one of the package posts may be varied to cause the deflection.

At block 62, movement of the movable mass is detected. This may be accomplished via the use of sense electrodes that are positioned on opposite sides of the movable mass. The sense electrodes may be electrically connected to an ASIC and the ASIC may be configured to detect differences in capacitance between the sense electrodes and the movable mass.

In summary, various embodiments of a microelectromechanical system package, a package assembly including a microelectromechanical system die, and a method of testing a microelectromechanical system are disclosed herein. In a first embodiment, the microelectromechanical system package includes, but is not limited to, a movable mass having a first portion and a second portion. The microelectromechanical system die further includes a first sense electrode mounted to the die spaced apart from the mass at a first location and configured to be electrically coupled with a controller. The microelectromechanical system die further includes a second sense electrode mounted to the die spaced apart from the mass at a second location and configured to be electrically coupled with the controller. The microelectromechanical system die further includes a first test electrode spaced apart from the mass at a third location and configured to be electrically connected to a first external electrical connector and to be biased at a first voltage when the first external electrical connector is connected to a first electric power source. The microelectromechanical system die still further includes a second test electrode spaced apart from the mass at a fourth location and configured to be electrically connected to a second external electrical connector and to be biased at a second voltage when the second external electrical connector is connected to a second electric power source. The controller is configured to detect a differential between a first capacitance existing between the movable mass and the first sense electrode and a second capacitance existing between the movable mass and the second sense electrode. The first test electrode and the second test electrode are configured to generate a net electrostatic force to move the movable mass with respect to the first sense electrode and the second sense electrode to create the differential between the first capacitance and the second capacitance when the first external electrical connector or the second external electrical connector are electrically connected to the first electric power source or the second electric power source, respectively.

In another non-limiting embodiment, the package assembly includes, but is not limited to, a controller die. The package assembly further includes a first external electrical connector configured for electrical coupling to a first electric power source. The package assembly further includes a second external electrical connector configured for electrical coupling to a second electric power source. The package assembly further includes a microelectromechanical system die electrically coupled with the controller die and further electrically coupled with the first external electrical connector and the second external electrical connector. The microelectromechanical system die includes a movable mass, a first sense electrode spaced apart from the movable mass at a first location and electrically coupled with the controller die, a second sense electrode spaced apart from the movable mass at a second location and electrically coupled with the controller die, a first test electrode spaced apart from the movable mass at a third location and electrically coupled with the first external electrical connector, the first test electrode being biased at a first voltage when the first external electrical connector is electrically connected to the first electric power source, and a second test electrode spaced apart from the movable mass at a fourth location and electrically coupled to the second external electrical connector, the second test electrode being biased at a second voltage when the second external electrical connector is electrically connected to the second electric power source. The controller die is configured to detect a differential between a first capacitance existing between the movable mass and the first sense electrode and a second capacitance existing between the movable mass and the second sense electrode. The first test electrode and the second test electrode are configured to generate a net electrostatic force to move the movable mass with respect to the first sense electrode and the second sense electrode to create the differential between the first capacitance and the second capacitance when the first external electrical connector or the second external electrical connector are electrically connected to the first electric power source or the second electric power source, respectively.

In another non-limiting embodiment, the method for testing a microelectromechanical system package includes, but is not limited to providing a microelectromechanical system package. The microelectromechanical system package has a test electrode arranged with respect to a movable mass such that a differential in voltage between the test electrode and the movable mass can be used to generate a net electrostatic force that can cause the movable mass to move. The test electrode is electrically connected to a first external electrical connector. The method further includes applying a voltage to the external electrical connector to cause a voltage differential between the test electrode and the movable mass to create a net electrostatic force that moves the movable mass. The method still further includes detecting movement of the movable mass with a controller of the microelectromechanical system package.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A microelectromechanical system package comprising:
a movable mass connected to a substrate;
a first sense electrode spaced apart from the movable mass at a first location and configured to be electrically coupled with a controller;
a second sense electrode spaced apart from the movable mass at a second location and configured to be electrically coupled with the controller;
a first test electrode spaced apart from the movable mass and mounted to the substrate at a third location, the first test electrode being electrically isolated from the controller, and the first test electrode being configured to be electrically connected to a first external electrical connecter and to be biased at a first voltage when the first external electrical connector is connected to a first electric power source; and
a second test electrode spaced apart from the movable mass and mounted to the substrate at a fourth location, the second test electrode being electrically isolated from the controller, and the second test electrode being configured to be electrically connected to a second external electrical connector and to be biased at a second voltage when the second external electrical connector is connected to a second electric power source,
wherein the controller is configured to detect a differential between a first capacitance existing between the movable mass and the first sense electrode and a second capacitance existing between the movable mass and the second sense electrode, and wherein the first test electrode and the second test electrode are configured to generate a net electrostatic force to move the movable mass with respect to the first sense electrode and the second sense electrode to create the differential between the first capacitance and the second capacitance when the first external electrical connector or the second external electrical connector are electrically connected to the first electric power source or the second electric power source, respectively.

2. The microelectromechanical system package of claim 1, wherein the first test electrode and the second test electrode are configured to operate at a higher voltage range than a voltage of the controller.

3. The microelectromechanical system package of claim 1, wherein the first test electrode and the second test electrode are on opposite sides of the movable mass.

4. The microelectromechanical system package of claim 1, wherein the movable mass is configured to be electrically coupled with the controller.

5. The microelectromechanical system package of claim 1, wherein the movable mass comprises a first portion and a second portion, and wherein the first portion is electrically insulated from the second portion yet still mechanically connected.

6. The microelectromechanical system package of claim 5, wherein the first portion is configured to be electrically coupled to the controller.

7. The microelectromechanical system package of claim 5, wherein the second portion is configured to be electrically coupled to a third external electrical connector.

8. The microelectromechanical system package of claim 6, wherein the first test electrode and the second test electrode are disposed proximate the second portion.

9. The microelectromechanical system package of claim 1, wherein the first sense electrode and the second sense electrode are substantially equidistant from the movable mass.

10. The microelectromechanical system package of claim 1, wherein the first test electrode and the second test electrode are substantially equidistant from the movable mass.

11. A package assembly comprising:
a controller die;
a first external electrical connector configured for electrical coupling to a first electric power source, the first external electrical connector being electrically isolated from the controller die;
a second external electrical connector configured for electrical coupling to a second electric power source, the second external electrical connector being electrically isolated from the controller die;
a microelectromechanical system die electrically coupled with the controller die and further electrically coupled with the first external electrical connector and the second external electrical connector, the microelectromechanical system die including:
a movable mass connected to a substrate,
a first sense electrode spaced apart from the movable mass at a first location and electrically coupled with the controller die,
a second sense electrode spaced apart from the movable mass at a second location and electrically coupled with the controller die,
a first test electrode spaced apart from the movable mass and mounted to the substrate at a third location, the first test electrode being electrically isolated from the controller die and electrically coupled to the first external electrical connector, and the first test electrode being biased at a first voltage when the first external electrical connector is electrically connected to the first electric power source, and
a second test electrode spaced apart from the movable mass and mounted to the substrate at a fourth location, the second test electrode being electrically isolated from and controller die and electrically coupled to the second external electrical connector, and the second test electrode being biased at a second voltage when the second external electrical connector is electrically connected to the second electric power source,
wherein the controller die is configured to detect a differential between a first capacitance existing between the movable mass and the first sense electrode and a second capacitance existing between the movable mass and the second sense electrode, and wherein the first test electrode and the second test electrode are configured to generate a net electrostatic force to move the movable mass with respect to the first sense electrode and the second sense electrode to create the differential between the first capacitance and the second capacitance when the first external electrical connector or the second external electrical connector are electrically connected to the first electric power source or the second electric power source, respectively.

12. The package assembly of claim 11, wherein the movable mass is electrically coupled with the controller die.

13. The package assembly of claim 11, wherein the movable mass is divided into a first portion and a second portion and wherein the first portion is electrically insulated from the second portion.

14. The package assembly of claim 13, wherein the first portion is configured to be electrically coupled to the controller die.

15. The package assembly of claim 13, further comprising a third external electrical connector configured for electrical connection to a third electric power source, wherein the second portion is electrically coupled to the third external electrical connector and wherein the second portion is maintained at a substantially constant voltage when the third external electrical connector is electrically connected to the third electric power source.

* * * * *